United States Patent
Tiirola et al.

(10) Patent No.: US 12,156,267 B2
(45) Date of Patent: Nov. 26, 2024

(54) DUAL CONNECTIVITY CONFLICT RESOLUTION FOR DISTRIBUTED UNITS

(71) Applicant: Nokia Technologies Oy, Espoo (FI)

(72) Inventors: Esa Tiirola, Oulu (FI); Keeth Saliya Jayasinghe Laddu, Espoo (FI); Mark Cudak, Rolling Meadows, IL (US); Ilkka Keskitalo, Oulu (FI); Juha Sakari Korhonen, Espoo (FI)

(73) Assignee: Nokia Technologies Oy, Espoo (FI)

( * ) Notice: Subject to any disclaimer, the term of this patent is extended or adjusted under 35 U.S.C. 154(b) by 467 days.

(21) Appl. No.: 17/634,301

(22) PCT Filed: Aug. 12, 2019

(86) PCT No.: PCT/EP2019/071578
§ 371 (c)(1),
(2) Date: Feb. 10, 2022

(87) PCT Pub. No.: WO2021/028015
PCT Pub. Date: Feb. 18, 2021

(65) Prior Publication Data
US 2022/0287123 A1 Sep. 8, 2022

(51) Int. Cl.
*H04W 76/15* (2018.01)
*H04L 5/16* (2006.01)
*H04W 76/20* (2018.01)
*H04B 7/155* (2006.01)
*H04L 5/00* (2006.01)
(Continued)

(52) U.S. Cl.
CPC .............. *H04W 76/15* (2018.02); *H04L 5/16* (2013.01); *H04W 76/20* (2018.02); *H04B 7/15542* (2013.01); *H04L 5/0023* (2013.01); *H04L 5/0091* (2013.01); *H04L 5/1469* (2013.01);
(Continued)

(58) Field of Classification Search
CPC ..... H04W 76/15; H04W 76/20; H04W 88/14; H04W 92/24; H04W 88/085; H04B 7/15542; H04L 5/0091; H04L 5/16; H04L 5/0023; H04L 5/1469
See application file for complete search history.

(56) References Cited

U.S. PATENT DOCUMENTS

2020/0100124 A1* 3/2020 Hampel ................ H04W 24/02

OTHER PUBLICATIONS

Ericsson: "IAB resource configuration and multiplexing" 3GPP Draft; R1-1 906588—IAB RA, 3rd Generation Partnership (Year: 2019).*

(Continued)

*Primary Examiner* — Kwang B Yao
*Assistant Examiner* — Bradley D Lytle, Jr.
(74) *Attorney, Agent, or Firm* — Barta Jones, PLLC

(57) ABSTRACT

A distributed unit, DU, of a radio access node configured to operate in a scenario where the DU is one of multiple DUs serving links to a multi-connected entity, acquires a first DU radio resource configuration for the DU, acquires a first link radio resource configuration corresponding to a first link of a multi-connectivity link of a multi-connected entity, wherein the first link is served by the DU, acquires a multiplexing configuration of the multi-connectivity link, and determines availability of at least one radio resource for the multi-connectivity link based on the first DU radio resource configuration, the first link radio resource configuration, and the multiplexing configuration.

20 Claims, 9 Drawing Sheets

(51) Int. Cl.
   *H04L 5/14*    (2006.01)
   *H04W 88/08*   (2009.01)
   *H04W 88/14*   (2009.01)
   *H04W 92/24*   (2009.01)

(52) U.S. Cl.
   CPC .......... *H04W 88/085* (2013.01); *H04W 88/14* (2013.01); *H04W 92/24* (2013.01)

(56) References Cited

OTHER PUBLICATIONS

3GPP TSG-RAN WG2 Meeting #105, Athens, Greece, Feb. 25-Mar. 1, 2019, R2-1900628, "Route redundancy support with multi-connectivity", Nokia, Nokia Shanghai Bell, 5 pgs.

3GPP TSG-RAN WG1 Meeting #97, Reno, US, May 13-17, 2019, R1-1906588, "IAB resource configuration and multiplexing", Ericsson, 9 pgs.

3GPP SGRAN WG1 #97, Reno, USA, May 13-17, 2019, R1-1907155, "Mechanisms for supporting access and backhaul link multiplexing", AT&T, 11 pgs.

3GPP TSG RAN WG1 Meeting #97, Reno, USA May 13-17, 2019, R1-1907267, "Updated IAB Resource Management Framework", Qualcomm Incorporated, 7 pgs.

\* cited by examiner

Fig. 2

Table 2A

| DU Configuration | MT configuration | | |
|---|---|---|---|
| | DL | UL | F |
| DL-H | DU: Tx<br>MT: NULL | DU: Tx<br>MT: NULL | DU: Tx<br>MT: NULL |
| DL-S | When DU resource: IA<br>DU: Tx<br>MT: NULL<br><br>When DU resource: INA<br>DU: NULL<br>MT: Rx | When DU resource: IA<br>DU: Tx<br>MT: NULL<br><br>When DU resource: INA<br>DU: NULL<br>MT: Tx | When DU resource: IA<br>DU: Tx<br>MT: NULL<br><br>When DU resource: INA<br>DU: NULL<br>MT: Tx/Rx |
| UL-H | DU: Rx<br>MT: NULL | DU: Rx<br>MT: NULL | DU: Rx<br>MT: NULL |
| UL-S | When DU resource: IA<br>DU: Rx<br>MT: NULL<br><br>When DU resource: INA<br>DU: NULL<br>MT: Rx | When DU resource: IA<br>DU: Rx<br>MT: NULL<br><br>When DU resource: INA<br>DU: NULL<br>MT: Tx | When DU resource: IA<br>DU: Rx<br>MT: NULL<br><br>When DU resource: INA<br>DU: NULL<br>MT: Tx/Rx |
| F-H | DU: Tx/Rx<br>MT: NULL | DU: Tx/Rx<br>MT: NULL | DU: Tx/Rx<br>MT: NULL |
| F-S | When DU resource: IA<br>DU: Tx/Rx<br>MT: NULL<br><br>When DU resource: INA<br>DU: NULL<br>MT: Rx | When DU resource: IA<br>DU: Tx/Rx<br>MT: NULL<br><br>When DU resource: INA<br>DU: NULL<br>MT: Tx | When DU resource: IA<br>DU: Tx/Rx<br>MT: NULL<br><br>When DU resource: INA<br>DU: NULL<br>MT: Tx/Rx |
| NA | DU: NULL<br>MT: Rx | DU: NULL<br>MT: Tx | DU: NULL<br>MT: Tx/Rx |

Table 2B

| | DL | UL | F |
|---|---|---|---|
| DL-H | DU: Tx<br>MT: NULL | DU: Tx<br>MT: Tx | DU: Tx<br>MT: Tx |
| DL-S | When DU resource: IA<br>DU: Tx<br>MT: NULL | When DU resource: IA<br>DU: Tx<br>MT: Tx<br><br>When DU resource: INA<br>DU: NULL<br>MT: Tx | When DU resource: IA<br>DU: Tx<br>MT: Tx<br><br>When DU resource: INA<br>DU: NULL<br>MT: Tx/Rx |
| UL-H | DU: Rx<br>MT: Rx | DU: Rx<br>MT: NULL | DU: Rx<br>MT: Rx |
| UL-S | When DU resource: IA<br>DU: Rx<br>MT: Rx<br><br>When DU resource: INA<br>DU: NULL<br>MT: Rx | When DU resource: IA<br>DU: Rx<br>MT: NULL<br><br>When DU resource: INA<br>DU: NULL<br>MT: Tx | When DU resource: IA<br>DU: Rx (only if MT is Rx and the DU knows that ahead of time)<br>MT: Rx<br><br>When DU resource: INA<br>DU: NULL<br>MT: Tx/Rx |
| F-H | DU: Tx/Rx<br>MT: Rx (only if DU is Rx and the parent DU is aware in advance) | DU: Tx/Rx<br>MT: Tx (only if DU is Tx and the parent DU is aware in advance) | DU: Tx/Rx<br>MT: Tx (only if DU is Tx and the parent DU knows that ahead of time), Rx (only if DU is Rx and the parent DU is aware in advance) |
| F-S | When DU resource: IA<br>DU: Tx/Rx<br>MT: Rx (only if DU is Rx and the parent DU is aware in advance)<br><br>When DU resource: INA<br>DU: NULL<br>MT: Rx | When DU resource: IA<br>DU: Tx/Rx<br>MT: Tx (only if DU is Tx and the parent DU is aware in advance)<br><br>When DU resource: INA<br>DU: NULL<br>MT: Tx | When DU resource: IA<br>DU: Tx/Rx<br>MT: Tx (only if DU is Tx and the parent DU knows that ahead of time), Rx (only if DU is Rx and the parent DU is aware in advance)<br><br>When DU resource: INA<br>DU: NULL<br>MT: Tx/Rx |
| NA | DU: NULL<br>MT: Rx | DU: NULL<br>MT: Tx | DU: NULL<br>MT: Tx/Rx |

Multiplexing Configuration 10A

| MCG MT \ SCG MT | DL | UL | Flex |
|---|---|---|---|
| DL | MCG -> DL | MCG -> DL | MCG -> DL |
| UL | MCG -> UL | MCG -> UL | MCG -> UL |
| Flex | SCG -> DL | SCG -> UL | MCG -> Flex |

Multiplexing Configuration 10B

| MCG MT \ SCG MT | DL | UL | Flex |
|---|---|---|---|
| DL | both -> DL | MCG -> DL | MCG -> DL |
| UL | MCG -> UL | both -> DL | MCG -> UL |
| Flex | MCG -> Flex | Flex | Flex |

Multiplexing Configuration 10C

| MCG MT \ SCG MT | DL | UL | Flex |
|---|---|---|---|
| DL | both -> DL | MCG -> DL | MCG -> DL |
| UL | MCG -> UL | both -> UL | MCG -> UL |
| Flex | SCG -> DL | SCG -> UL | MCG -> Flex |

Fig. 10

DUAL CONNECTIVITY CONFLICT RESOLUTION FOR DISTRIBUTED UNITS

CROSS REFERENCE TO RELATED APPLICATION

This patent application is a U.S. National Stage application of International Patent Application Number PCT/EP2019/071578 filed Aug. 12, 2019, which is hereby incorporated by reference in its entirety.

TECHNICAL FIELD

At least some example embodiments relate to resolving a dual connectivity conflict for distributed units (DUs), e.g. for two parent distributed units. At least some example embodiments relate to integrated access and backhaul (IAB), more specifically to resource configuration in the case of IAB node connected to at least two parent nodes, e.g. one via MCG (Master Cell Group) and another via SCG (Secondary Cell Group).

LIST OF ABBREVIATIONS

ACK Acknowledgement
ADL Access DL
BH Backhaul
BSR Buffer Status Report
CDL Child DL
CSI Channel State Information
CU Central Unit
DCI Downlink Control Information
D, DL Downlink
DeNB Donor eNB
DL Downlink
DU Distributed unit
eMBB Enhanced Mobile BroadBand
F Flexible
F1-C F1 (interface between CU and DU) control interface
F1-AP F1 application protocol
GP Guard Period
HARQ Hybrid Automatic Repeat ReQuest
IAB Integrated Access and Backhaul
ID Identity
INA Indicated Not Available
MAC Medium Access Control
MAC CE MAC Control Element
MCG Master Cell Group
MT Mobile termination
NA Not Available
NR New Radio (5G radio)
PDCCH Physical Downlink Control Channel
PDL Parent DL
PDSCH Physical Downlink Shared Channel
PRACH Physical Random Access Channel
PRB Physical Resource Block
PUCCH Physical Uplink Control Channel
PUL Parent UL
PUSCH Physical Uplink Shared Channel
QPSK Quadrature Phase Shift Keying
RN Relay Node (self-backhaul node)
RRC Radio Resource Control
Rx Receiver
RS Reference Signal
SCG Secondary Cell Group
SFI Slot Format Indication
SDM Space Division Multiplexing
SSB Synchronization Signal Block
TDM Time Division Multiplexing
Tx Transmission
U, UL Uplink
UCI Uplink Control Information
UE User Equipment
UL Uplink
URLLC Ultra Reliable Low Latency Communication

BACKGROUND

Currently, multi-connectivity to support route redundancy and route selection for IAB is under discussion. Mechanisms for resource multiplexing among backhaul and access links as objectives related to radio resource allocation under responsibility of RAN1 include:
  Semi-static configuration for IAB-node/IAB-donor DU resources in case of TDM operation subject to half-duplex constraint. This should be forward compatible to allow the support of half-duplex scenarios with FDM and SDM resource sharing among backhaul and access links.
  Time resource types for DU's child links: DL hard, DL soft, UL hard, UL soft, Flexible hard, Flexible soft, Not Available.
  Required transmission/reception rules for IAB-nodes and associated behaviors regarding time resource utilization.

SUMMARY

At least some example embodiments relate to determining IAB functionality in multi-connectivity scenarios where MT resources of an IAB node are configured separately for (at least) two parent nodes, MCG and (at least one) SCG. For example, in a multi-connectivity scenario, two (or more) parent nodes operate under the same CU. In another multi-connectivity scenario, two (or more) parent nodes operate under different CUs.

According to at least some example embodiments, this is achieved by a method, an apparatus and a non-transitory computer-readable storage medium as specified by the appended claims.

At least some example embodiments provide a scalable solution which supports any number of SCG nodes.

At least some example embodiments support both scenarios, i.e. a scenario in which MCG and SCG have the same number of hops and a scenario in which MCG and SCG have a different number of hops.

According to at least some example embodiments, a small amount of signaling is required.

At least some example embodiments support dynamic adjustment of resources available for MCG/SCG.

At least some example embodiments support hybrid operation of TDM/FDM/SDM (between MCG/SCG) using the same resource configuration framework.

At least some example embodiments support both TDM and FDM/SDM between Parent BH and Child links.

At least some example embodiments do not require coordination between MCG and SCG.

In the following the invention will be described by way of embodiments thereof with reference to the accompanying drawings.

BRIEF DESCRIPTION OF THE DRAWINGS

FIG. 2 shows tables 2A and 2B illustrating combinations of DU configuration and MT configuration.

FIG. 10 shows tables illustrating multiplexing configurations 10A, 10B and 10C according to at least some example embodiments.

DESCRIPTION OF THE EMBODIMENTS

In the following example embodiments and example implementations will be described by referring to the accompanying drawings.

It is to be noted that the scope of protection sought for various embodiments is set out by the independent claims. The example embodiments and example implementations described in this specification that do not fall under the scope of the independent claims are to be interpreted as examples useful for understanding the various embodiments.

First, an IAB environment in which at least some example embodiments are implementable will be described.

Figure 1:
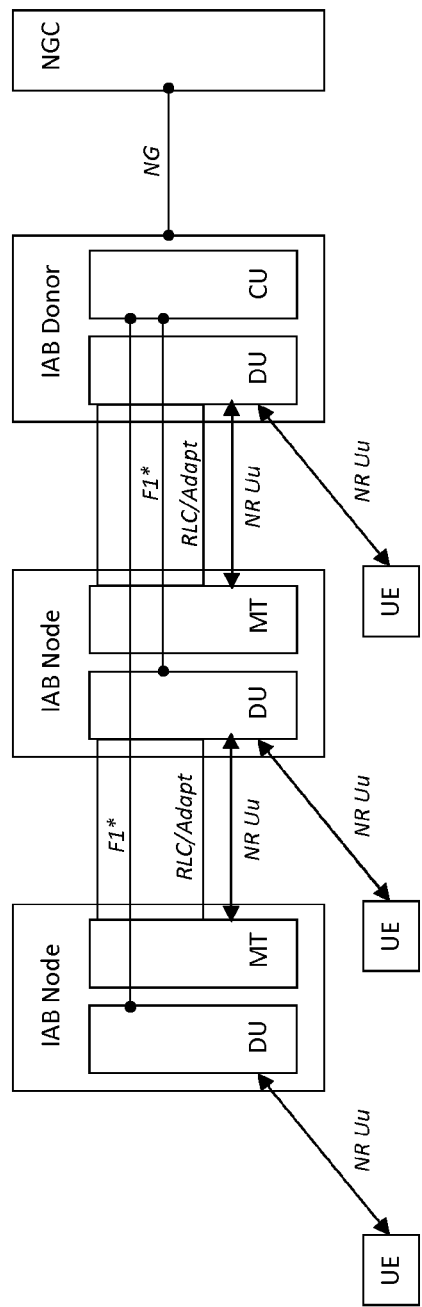
FIG. 1 shows a schematic block diagram illustrating an IAB architecture.

IAB Architecture:

FIG. 1 shows a high-level IAB architecture with L2 relaying leveraging the split gNB architecture, in which at least some example embodiments are implementable.

An IAB donor node hosts a centralized unit (CU) for all IAB nodes, i.e. it runs RRC, higher L2 (PDCP) and control functions for the subtending IAB topology. Distributed units (DUs) reside at the IAB nodes hosting the lower L2 radio protocol layers (RLC, MAC) and the physical (PHY) layer. DUs have also an additional layer (adaptation layer) above the RLC layer for routing the BH links as well as mapping radio bearers to RLC channels. The CU has basically two control interfaces to the IAB nodes, namely RRC connection to the IAB-MT and F1-C to the IAB-DU. Hence, both RRC signaling and F1-AP are available for the IAB configuration and control. With this architecture the radio resources usage can have central coordination by the donor CU.

For example, radio resources relate to time and/or frequency domain resources. For example, time domain resources are defined in terms of OFDM symbols, slots, subframes, etc., and frequency domain resources are defined as physical resource blocks (PRBs) of a certain carrier or a bandwidth part of a carrier.

IAB Resource Coordination:

From an IAB-node MT point-of-view, the following time-domain resources can be indicated for the parent link: downlink time resource, uplink time resource, and flexible time resource.

From an IAB-node DU point-of-view, the child link has the following types of time resources: downlink time resource, uplink time resource, flexible time resource, not available (NA) time resources (resources not to be used for communication on the DU child links).

Each of the downlink, uplink and flexible time-resource types of the DU child link can belong to one of two categories:

Hard: The corresponding time resource is always available for the DU child link; and Soft: The availability of the corresponding time resource for the DU child link is explicitly and/or implicitly controlled by the parent node.

In order to support mechanisms for resource allocation for IAB nodes, semi-static configuration is supported for the configuration of IAB node DU resources. In addition, dynamic indication (L1 and/or MAC (Medium Access Control) signaling) to an IAB node of the availability of soft resources for an IAB node DU is supported. Existing L1 signaling methods are used as the baseline, while potential enhancements (e.g. new slot formats), rules for DU/MT behavior in case of conflicts across multiple hops, and processing time constraints at the IAB node may need to be considered.

FIG. 2 shows tables 2A and 2B which capture the possible combinations of DU and MT behavior for different single connectivity scenarios. In the tables below the following definitions apply:

"MT: Tx" means that the MT should transmit if scheduled.

"DU: Tx" means that the DU may transmit.

"MT: Rx" means that the MT should be able to receive (if there is anything to receive).

"DU: Rx" means that the DU may schedule uplink transmissions from child nodes or UEs.

"MT: Tx/Rx" means that the MT should transmit if scheduled and should be able to receive, but not simultaneously.

"DU: Tx/Rx" means that the DU may transmit and may schedule uplink transmission from child nodes and UEs, but not simultaneously.

"IA" means that the DU resource is explicitly or implicitly indicated as available.

"INA" means that the DU resource is explicitly or implicitly indicated as not available.

"MT: NULL" means that the MT does not transmit and does not have to be able to receive.

"DU: NULL" means that the DU does not transmit and does not schedule uplink transmission from child nodes and UEs.

The tables 2A and 2B assume an IAB node not capable of full-duplex operation (i.e. simultaneous transmission and reception for MT and DU links).

Table 2A applies in case of TDM operation, where there can be no simultaneous transmission in the DU and the MT, nor any simultaneous reception in the DU and the MT.

Table 2B applies in case of SDM operation, where there can be simultaneous transmission in the DU and the MT, alternatively simultaneous reception in the DU and the MT.

Dual Connectivity:

Dual connectivity will enable topological redundancy by providing an alternative link and a redundant route to the donor node. This will improve the reliability and robustness for potential link failures. A basic approach to establish IAB dual connectivity according to legacy NR DC is illustrated in FIG. 3.

In this scenario the IAB-MT is configured, in addition to MCG, with SCG to another parent node. In the in-band IAB scenario both DC links operate on the same carrier. Also, the child links are on the same carrier, i.e. operating as intra-frequency dual connectivity. Furthermore, the IAB node is limited with the half-duplex constraint where the IAB transmission and reception cannot happen at the same time instant.

Figure 3:
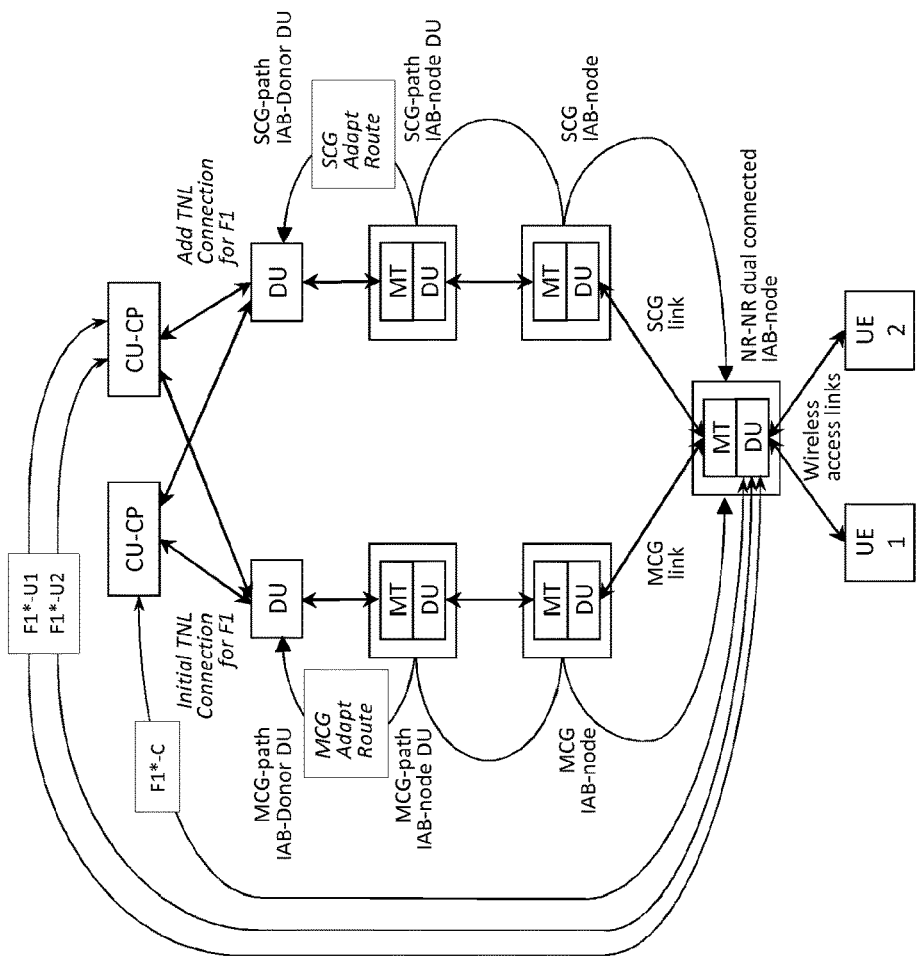
FIG. 3 shows a diagram illustrating an example of an IAB DC scenario.

It is to be noted that the IAB node structure shown in FIG. 3 could also have two (logical or physical) MT units, each having a separate single connectivity to the parent node. However, from the radio resource usage perspective, this will not be different from the NR DC behavior. Therefore, the description below considers the single MT case but the principles are equally applicable for dual-MT (doubled single-connectivity) IAB implementation only that there will be two MCGs configured instead of MCG and SCG.

Figure 4:
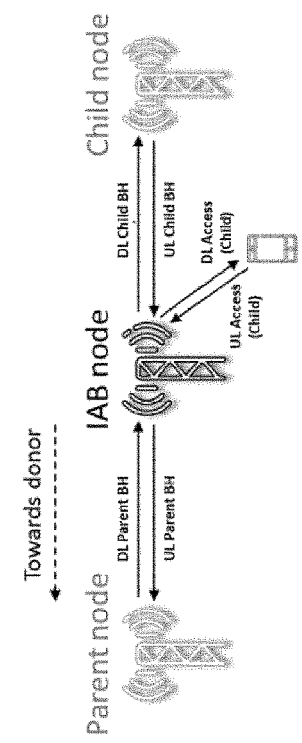
FIG. 4 shows a diagram for describing a definition of IAB nodes and links between IAB nodes and access UEs.

FIG. 4 shows basic connections between the IAB nodes and access UEs. From the middle IAB node shown in FIG. 4 (or nodes IAB #1-4 shown in FIG. 5) perspective, there are parent BH links as well as child BH and access links, all for both UL and DL.

An IAB node in which at least some example embodiments are implementable contains two separate parts. A mobile terminal part, which facilitates parent BH connections between a parent node and the IAB node, and a DU (distributed unit) part, which facilitates child connections between the IAB node and a child node as well as between the IAB node and UE terminals connected to the IAB node via access links.

Further, resource configuration is made by means of separate configurations, e.g. separately for DU and MT parts of the IAB node, and separately for each IAB node.

Finally, resource configuration for MCG and SCG is made by means of separate configurations, e.g. one resource configuration for MCG and another resource configuration for SCG.

The problem with IAB DC is how to coordinate the use of radio resources on the two BH links served by master node (MN, for MCG link) and secondary node (SN, for SCG link).

More specifically the issues are related to
IAB nodes connected to different Donors/CUs,
different DU configurations at MN and SN,
knowledge about the MT configuration which pertains particularly to SN if/when the MT configuration is done over the MCG link, and
potential conflicts in radio resource usage like link direction and/or link type and how to resolve the conflicts.

It should be noted that in the case of DC, connection between the involved DUs is not available, or if available, real time (w.r.t. radio timing) information sharing over wireless connections is not possible.

At least some example embodiments relate to dual connectivity (DC) for IAB with respect to child link transmission/reception at the IAB node, i.e. DC from DU point of view, where at least two involved links (MCG/and at least one SCG) are located within two IAB nodes. This aspect is indicated as "case #2" in FIG. 5.

At least some example embodiments solve the problem of how to determine the IAB functionality in the dual connectivity scenarios where MT resources of the IAB node are configured separately for (at least) two parent nodes, MCG and (at least one) SCG, where two (or more) parent nodes operate under the same CU or two (or more) parent nodes operate under different CUs.

Figure 5:
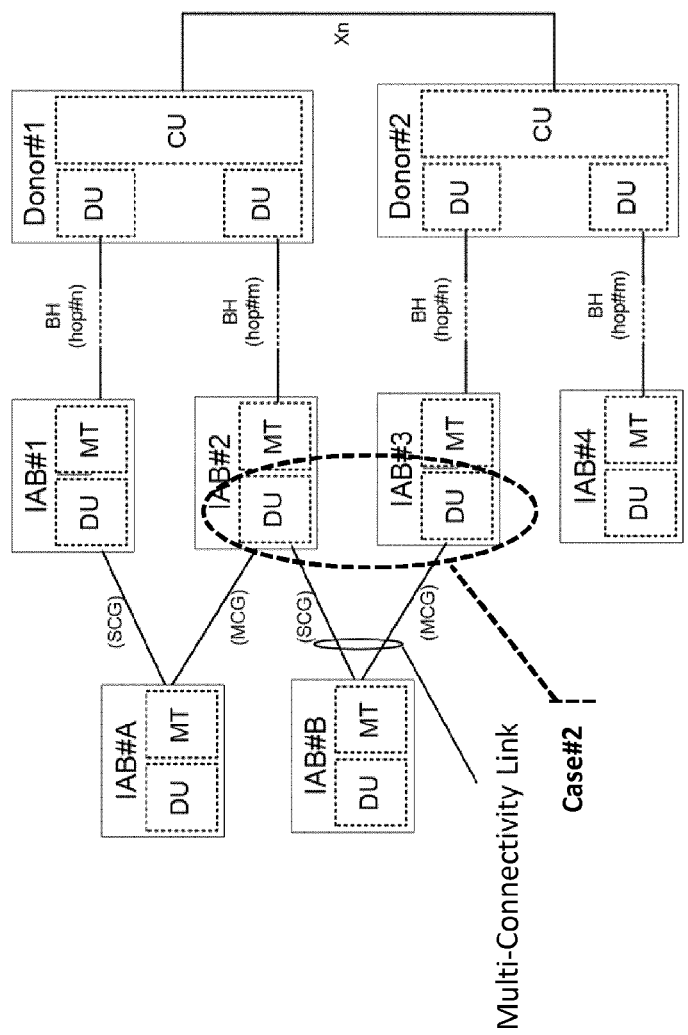
FIG. 5 shows a schematic block diagram illustrating a scenario according to at least some example embodiments.

An example of the considered scenario in which at least some example embodiments are implementable is shown in FIG. 5. In a preferred example embodiment, MCG and SCG are operating in the same frequency band (TDD). FIG. 5 illustrates case #2 regarding dual connectivity (DC) for IAB with respect to child link transmission/reception at the IAB node, i.e. DC from DU point of view, where at least two involved links (MCG/and at least one SCG) are located within two IAB nodes.

FIG. 5 shows donor nodes Donor #1 and Donor #2 each providing a CU to IAB nodes IAB #1, IAB #2, IAB #A and IAB #3, IAB #4, IAB #B, respectively. IAB #1 is a parent node for IAB #A and serves an SCG link with the IAB #A, IAB #2 is a parent node for IAB #A and IAB #B and serves an MCG link with the IAB #A and an SCG link with the IAB #B, and IAB #3 is a parent node for IAB #B and serves an MCG link with the IAB #B.

IAB #1 is connected to Donor #1 via n BH hops, IAB #2 is connected to Donor #1 via m BH hops, IAB #3 is connected to Donor #2 via n BH hops, and IAB #4 is connected to Donor #2 via m BH hops. m and n are integers equal to or greater than 0. The condition m=0 or/and n=0 corresponds to the situation (not shown in the figure) where one/both of the parents of a node with DC is/are Donor nodes.

Donor #1 and Donor #2 are connected via Xn interface.

The IAB nodes shown in FIG. 5 each comprise a mobile terminal part, which facilitates parent BH connections between the parent node and the IAB node, and a DU (distributed unit) part, which facilitates child connections between the IAB node and the child node as well as between the IAB node and UE terminals connected to the IAB node via access links (not shown in FIG. 5).

At least some example embodiments provide a solution to the problem of determining resource availability for a parent node (such as IAB #2 or IAB #3) configured to operate as a part of dual connectivity configuration with an IAB node (such as IAB #B).

In some example embodiments, a term "multi-connected entity" is used to refer to an IAB node with multiple parent nodes. In some example embodiments, a multi-connected entity is an MT or a user equipment served by multiple nodes.

The term "multi-connectivity link" is used to refer collectively to the links that a multi-connected entity has with all the parent nodes. In FIG. 5, IAB #B's multi-connectivity link comprises a link (marked as SCG) with IAB #2 and another link (marked as MCG) with IAB #3.

According to at least some example embodiments, the resource availability of a multi-connected entity (e.g. IAB #B) is determined based on the following information:
a DU radio resource configuration of the parent node corresponding to a first link of a multi-connectivity link of the multi-connected entity (e.g. DU configuration of IAB #2 or IAB #3),
an MT radio resource configuration corresponding to the first link,
an MT radio resource configuration corresponding a second link of the multi-connectivity link of the multi-connected entity,
a multiplexing configuration between the first and second links of the multi-connectivity link,
a priority of the first link, and
predefined rules.

According to an example implementation, MT configuration is common for the first and the second link.

Based on the determined resource availability, the IAB node (e.g. IAB #2 or IAB #3) may perform scheduling (resource allocation) for the first link.

According to at least some example embodiments, the parent node (e.g. IAB #2 of FIG. 5) is made aware of the MT configuration (e.g. MT configuration of IAB #B) of the second link. According to an example implementation, this is performed by F1 signaling supporting indication of MT configuration not only for the desired link (i.e. first link) but also MT configuration for the link connected to another DU (i.e. second link). If the parent node does not acquire an MT configuration for the second link, according to an example implementation the parent node assumes that the first and the second link have the same configuration at the MT.

According to at least some example embodiments, the parent node (such as IAB #2 of FIG. 5) is made aware of the child MT's multiplexing configuration. These configurations include TDM between two links of the multi-connectivity link, SDM/FDM between two links of the multi-connectivity link, and full duplex between two links of the multi-connectivity link.

According to at least some example embodiments, the parent node is made aware of the priority of the link of the multi-connectivity link with respect to another link/other links of the multi-connectivity link. For example, in the case of dual connectivity, the parent node is made aware if the link of the multi-connectivity link is MCG or SCG.

Based on this information and predefined multiplexing rules, the parent node is enabled to determine that a certain resource
- is available for the parent node (e.g. first link) and is not available for another link (e.g. second link) of the multi-connectivity link,
- is not available for the parent node (e.g. first link) and is available for another link (e.g. second link) of the multi-connectivity link,
- is available for both parent node (e.g. first link) and for another link (e.g. second link) of the multi-connectivity link.

Figure 6:
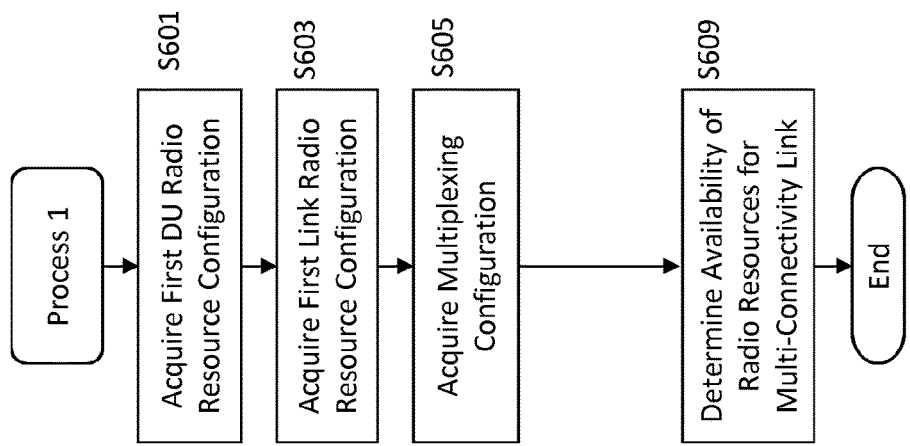
FIG. 6 shows a flowchart illustrating a process 1 according to at least some example embodiments.

FIG. 6 shows a flowchart illustrating a process 1 according to at least some example embodiments. According to an example implementation, the process 1 is performed by a DU (e.g. DU of IAB #2 or DU of IAB #3 shown in FIG. 5) configured to operate in a multi-connectivity scenario which is a scenario where the DU is one of multiple DUs serving links to a multi-connected entity. For example, the DU is part of a radio access node.

It is noted that a radio access network (RAN) covers a geographical area which is divided into cell areas, with each cell area being served by a radio access node, e.g. a Radio Base Station (RBS). In some radio access networks the radio access node may e.g. be called "NodeB" or enhanced NodeB (eNB) or next generation NodeB (gNB). The logical architecture of a radio access node may be such that it comprises a plurality of logical nodes, here called distributed units (DUs), some comprising only a subset of the radio access node's functions, and that may be controlled by a central unit (CU).

In step S601 of FIG. 6, a radio resource configuration (also referred to as "first DU radio resource configuration") for the DU is acquired.

In step S603, a radio resource configuration (also referred to as "first link radio resource configuration") corresponding to a first link of a multi-connectivity link of a multi-connected entity (e.g. IAB #B shown in FIG. 5) is acquired, wherein the first link is served by the DU. The first link is any one of an MCG link and an SCG link.

According to at least some example implementations, the multi-connected entity comprises an IAB node and the first link radio resource configuration is an MT configuration used for the first link.

According to at least some example implementations, the multi-connected entity comprises a UE and the first link radio resource configuration is a configuration of the UE used for the first link.

In step S605, a multiplexing configuration of the multi-connected entity is acquired.

In step S609, availability of at least one radio resource for the multi-connectivity link is determined based on the first DU radio resource configuration, the first link radio resource configuration, the multiplexing configuration, and the priority. According to at least some example embodiments, the availability also is determined based on predefined rules.

It is to be noted that the order of steps S601-S605 is not limited to the order shown in FIG. 6.

According to at least some example embodiments, in addition to the information acquired in steps S601-S605, a priority of the first link is acquired and used for determining the availability of the at least one radio resource for the multi-connectivity link.

According to at least some example embodiments, in addition to the information acquired in steps S601-S605, a resource configuration (also referred to in the following as "second link radio resource configuration") corresponding to a second link of the multi-connectivity link is acquired and used for determining the availability of the at least one radio resource for the multi-connectivity link. In case the first link is an MCG link, the second link is an SCG link.

According to at least some example implementations, the multi-connected entity comprises the IAB node and the second link radio resource configuration is an MT configuration used for the second link.

According to at least some example implementations, the multi-connected entity comprises the UE and the second link radio resource configuration is a configuration of the UE used for the second link.

For example, in case no information on a second link radio resource configuration is acquired, it is assumed that the second link radio resource configuration is similar to the first link radio resource configuration.

According to at least some example embodiments, in addition to the information acquired in steps S601-S605, a radio resource configuration (also referred to in the following as "second DU radio resource configuration") for another DU serving the second link is acquired and used for determining the availability of the at least one radio resource for the multi-connectivity link.

According to at least some example embodiments, predefined multiplexing rules (which will be described in more detail later on) comprise, in case of TDM/FDM/SDM operation between two links of the multi-connectivity link, at least one predefined resource combination between the links, indicating that the corresponding time resource is available for the lower priority link (and not available for the higher priority link). Otherwise, when there is no such indication, the corresponding time resource is available for the higher priority link (and not available for the lower priority link).

According to at least some example embodiments, it is determined that the first link has highest priority in case the multiplexing configuration indicates for at least one predefined combination of a first resource corresponding to the first link radio resource configuration and a second resource corresponding to the second link radio resource configuration that the first resource is not available. Further, in case of FDM/SDM operation between the links, at least one predefined resource combination indicates that the corresponding time resource is available for both links.

According to at least some example embodiments, in case the multiplexing configuration corresponds to at least one of FDM and SDM, and indicates for at least one predefined combination of a first resource corresponding to the first link radio resource configuration and a second resource corresponding to the second link radio resource configuration that the first resource and the second resource are available, determining that the first resource is available.

In at least one example embodiment, MT indicates through the first link the outcome of dynamic resource configuration received via the second link. For example, when MT receives DCI 2_0 indicating that certain flexible resources are used as DL or UL, it conveys this information to another link (e.g. second link) of the multi-connectivity link. In at least one example embodiment, signaling is based on relaying of an SFI (Slot Format Indication) as such. This requires that the parent node of the first link is aware of an SFI configuration related to the second link.

Figure 7:
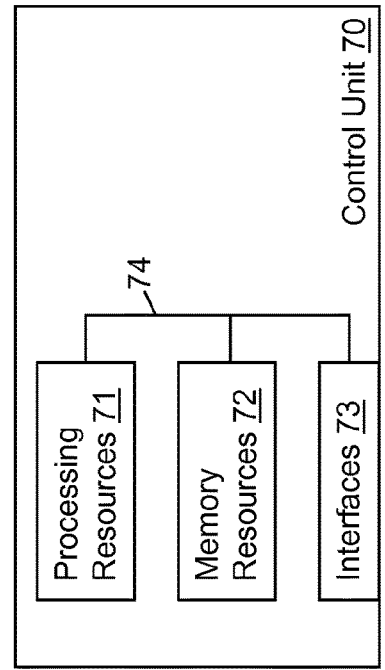
FIG. 7 shows a schematic block diagram illustrating a configuration of a control unit in which example embodiments are implementable.

Now reference is made to FIG. 7 for illustrating a simplified block diagram of a control unit 70 that is suitable for use in practicing at least some example embodiments.

According to an example implementation, the control unit 70 is configured to execute process 1 shown in FIG. 6. Alternatively or in addition, the control unit 70 is part of and/or used by a DU of an IAB.

The control unit 70 comprises processing resources (e.g. processing circuitry) 71, memory resources (e.g. memory circuitry) 72 and interfaces (e.g. interface circuitry) 73, coupled via a connection 74.

According to an example implementation, the memory resources 72 store a program that when executed by the processing resources 71, enable the control unit 70 to operate in accordance with at least some example embodiments.

In general, at least some example embodiments are implemented by computer software stored in the memory resources 72 and executable by the processing resources 71 of the control unit 70, or by hardware, or by a combination of software and/or firmware and hardware.

The terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and printed electrical connections, as well as by the use of electromagnetic energy, such as electromagnetic energy having wavelengths in the radio frequency region, the microwave region and the optical (both visible and invisible) region, as non-limiting examples.

Further, as used in this application, the term "circuitry" refers to one or more or all of the following:

(a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of "circuitry" applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

Figure 8:
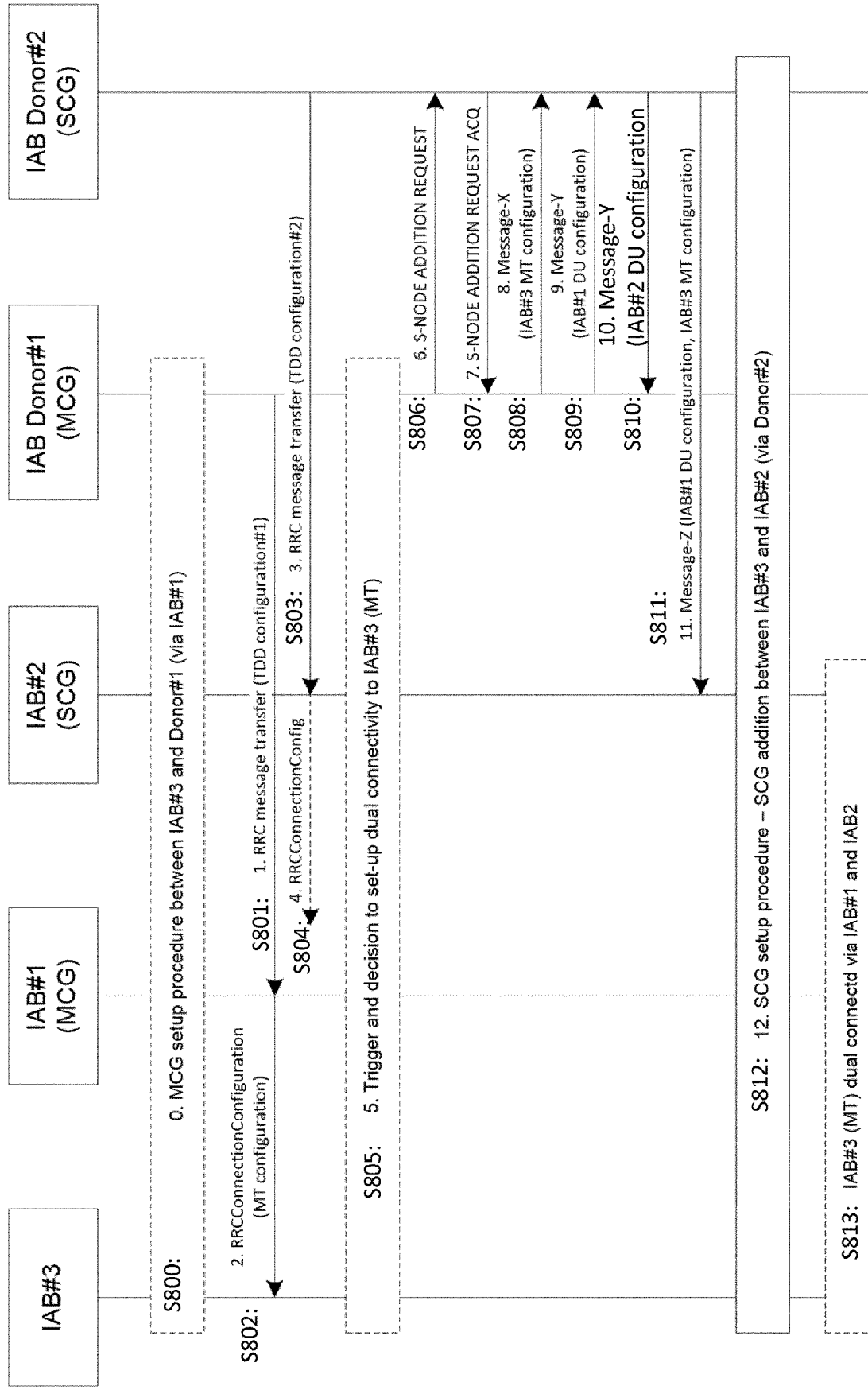
FIG. 8 shows a signaling diagram illustrating dual connectivity signaling according to an example implementation.

FIG. 8 shows a signaling diagram illustrating an example of dual connectivity signaling to provide required information for DC nodes according to an example implementation.

According to the example implementation shown in FIG. 8, dual connectivity between two IAB Donors (CUs) (IAB Donor #1 (MCG) and IAB Donor #2 (SCG)) is set up, enabling usage of at least some example embodiments, e.g. usage of process 1 shown in FIG. 6. The signaling illustrated in FIG. 8 allows information exchange about the IAB DU configuration (e.g. first/second DU radio resource configuration(s)) and IAB MT configuration (e.g. first/second link radio resource configuration(s)) between MCG and SCG paths.

The initial state in S800 of FIG. 8 is that IAB nodes (MT parts of IAB nodes) #1 and #2 have established connection to the IAB Donor #1 and the IAB Donor #2, respectively. A DU part of IAB nodes #1 and #2 is configured via established F1 connection between the respective donor CU and the respective IAB DU. Similarly, IAB #3 establishes radio connection, in this example via IAB #1, to IAB Donor #1. The IAB #1 MT configuration is done by sending RRCConfiguraton-message first over the F1 connection between IAB Donor #1 and IAB #1 in an RRC message container (message 1: "RRC message transfer (TDD configuration #1)", S801) and further over an Uu interface to the IAB #3 in an RRC message "RRCConnectionConfiguration (MT Configuration)" (message 2, S802).

Similarly, IAB #2 MT configuration is done by sending RRCConfiguraton-message first over the F1 connection between IAB Donor #2 and IAB #2 in an RRC message container (message 3: "RRC message transfer (TDD configuration #2)", S803) and further over an Uu interface to an IAB (not shown in FIG. 8) in an RRC message "RRCConnectionConfiguration (MT Configuration)" (message 4, S804).

There can be multiple events triggering the establishment of dual connectivity (DC) to the IAB #3. These can be e.g. need for load balancing for the BH link, request to establish redundant BH connectivity for more robust BH operation, measurement report from the IAB #3 (MT) indicating deteriorated radio performance, or other triggers for needing topology changes indicated in S805 ("5. Trigger and decision to set-up dual connectivity to IAB #3 (MT)"). The establishment of DC is initiated by the IAB Donor #1 responsible for the MCG connection to the IAB #3. The IAB Donor #1 sends a message "S-NODE ADDITION REQUEST" (S806, message 6) over Xn interface to IAB Donor #2 which in the successful case is acknowledged by the IAB Donor #2 with a message "S-NODE ADDITION REQUEST ACK" (S807, message 7). The donors exchange information about the IAB DU and MT radio configurations related to configured dual connectivity in S808 to S810

(message 8: "Message-X (IAB #3 MT configuration)", message 9: "Message-Y (IAB #1 DU configuration)", message 10: "Message-Y (IAB #2 DU configuration)") and forward the information to the IAB nodes (e.g. IAB #2) involved in the DC in S811 (message 11).

According to an example implementation, messages 8-11 do not have to be new or separate messages but are some of existing messages carrying information as described above. For example, information of messages X and Y are carried in the messages 6 and 7.

At the end of the procedure, in S812, IAB #3 MT has the secondary link (SCG) configured via the Donor #2 and IAB #2 while the Donor #1 and IAB #1 serve for the master link (MCG).

It should be understood that there can be alternative signaling procedures providing the same information to the IAB nodes thus enabling the use of at least some example embodiments, e.g. process 1 of FIG. 6. Therefore, a particular signaling procedure is not mandated to be implemented when applying process 1.

Figure 9:
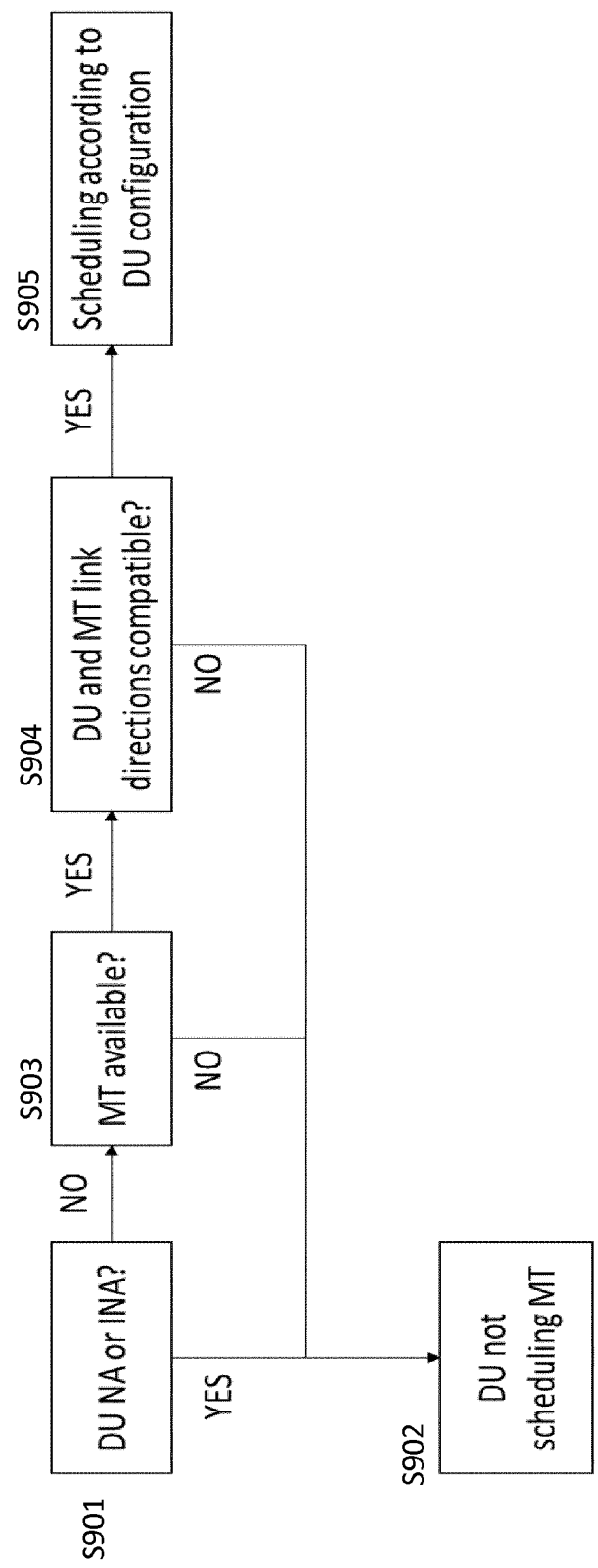
FIG. 9 shows a flowchart illustrating a DU procedure for deciding on MT scheduling according to at least some example embodiments.
Figure 11:
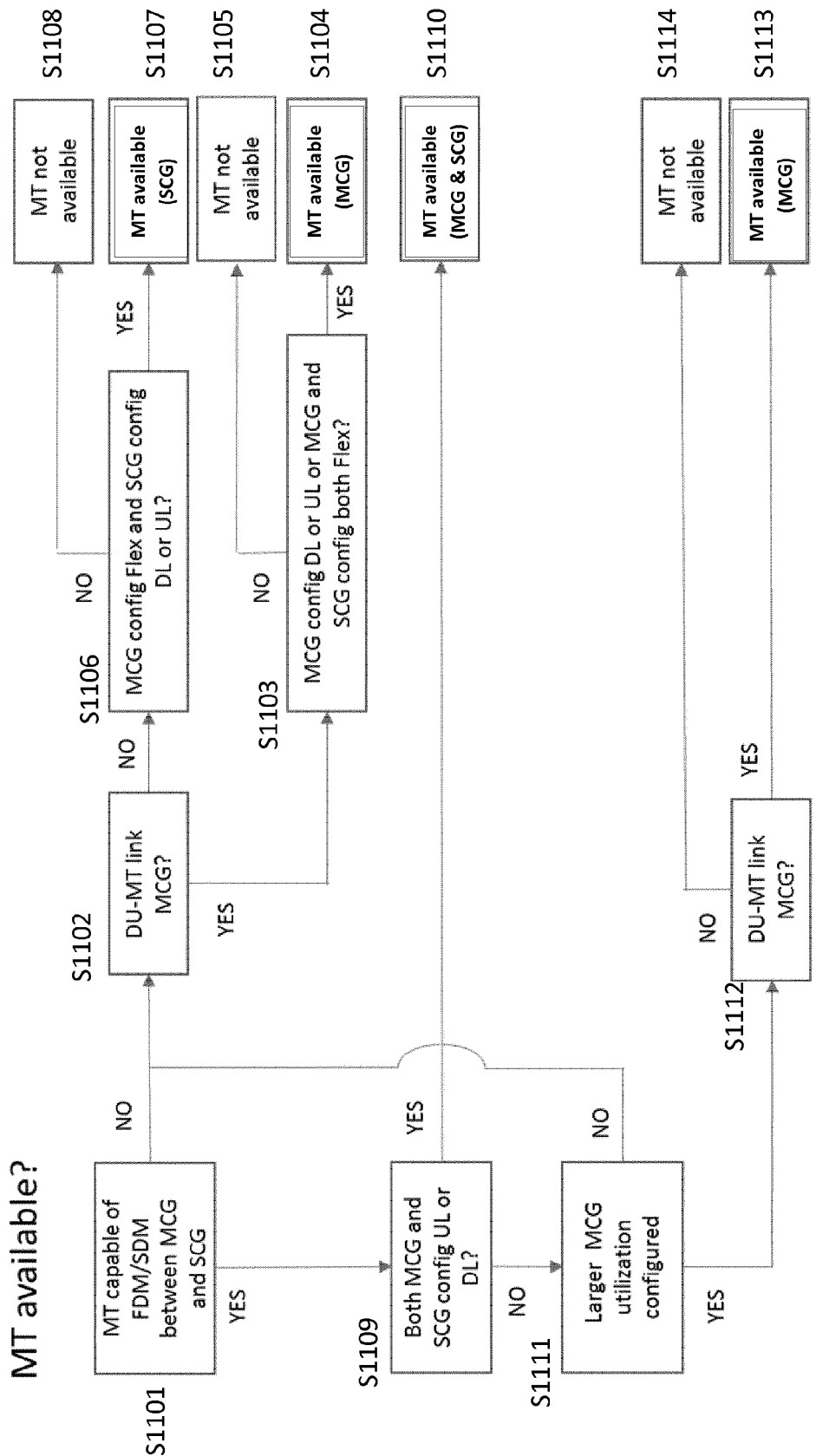
FIG. 11 shows a flowchart illustrating a DU procedure for deciding on MT availability according to at least some example embodiments.

FIG. 9 shows a procedure that DU follows to decide on MT scheduling according to at least some example embodiments. The procedure in this level is identical for DU with MCG and SCG links. MCG and SCG links are treated differently in block S903 "MT available?". Details of block S903 will be described below and are shown in FIG. 11.

In S901 of FIG. 9, it is determined whether DU is NA or INA, e.g. based on the first DU radio resource configuration acquired in S601 of FIG. 6. In case DU is NA or INA ("Yes" in S901), the procedure proceeds to S902 in which the DU does not schedule MT.

Otherwise, if "No" in S901, the procedure proceeds to S903 in which it is determined whether MT is available. If "No" in S903, the procedure proceeds to S902 in which the DU does not schedule MT.

Otherwise, if "Yes" in S903, the procedure proceeds to S904 in which it is determined whether DU and MT link directions are compatible (for example, if both are for DL they are compatible, whereas if one is DL and another is UL, they are not compatible). If "No" in S904, the procedure proceeds to S902 in which the DU does not schedule MT.

Otherwise, if "Yes" in S904, the procedure proceeds to S905 in which scheduling is performed according to DU configuration.

FIG. 10 shows tables illustrating multiplexing configurations 10A, 10B and 10C.

From the viewpoint of parent node, when operating according to TDM between MCG link and SCG link, at least one predefined resource combination "MCG MT/SCG MT" indicates that the corresponding time resource is reserved for the SCG link (and is not available for the MCG link). Table 10A shows a corresponding example:

MCG MT Flexible & SCG MT DL: SCG DL.
MCG MT Flexible & SCG MT UL: SCG UL.
Other combinations: MCG MT according to configuration.

It should be noted that this mode of operation can be made available also when IAB node supports FDM/SDM between MCG and SCG links.

When operating according to FDM/SDM between SCG and MCG links, at least one predefined resource combination "MCG MT/SCG MT" indicates that the corresponding time resource is reserved for both SCG link and MCG link. Table 10B shows a corresponding example:

MCG MT DL & SCG MT DL: Both DL.
MCG UL & SCG UL: Both UL.
Other combinations: MCG MT according to configuration.

According to an example implementation, MCG MT Flexible & SCG MT DL and MCG MT Flexible & SCG MT UL are reserved for SCG DL/UL also in the FDM/SDM scenario. This principle is shown in Table 10C.

According to at least some example embodiments, the duplexing operation is determined based on an indication received from CU or parent IAB node. The duplexing operation depends also on the capability of the IAB node (such as number of antenna panels, baseband processing capability). Here, focus with respect to the duplexing operation has been on the Parent BH links (i.e. duplexing between MCG and SCG links). With respect to duplexing between Parent BH link(s) and Child link(s), at least some example embodiments support both TDM and FDM/SDM.

FIG. 11 combines content of Tables 10A-10C for a procedure that DU follows to decide on the availability of MT according to at least some example embodiments.

In S1101 of FIG. 11, it is determined whether MT is capable of FDM/SDM between the MCG link and the SCG link, e.g. based on the first link radio resource configuration acquired in S603 of FIG. 6.

If "No" in S1101, the procedure advances to S1102 in which it is determined whether the DU-MT link is an MCG link, e.g. based on the multiplexing configuration acquired in S605 of FIG. 6 and/or the acquired priority.

In case the DU-MT link is the MCG link, the procedure advances to S1103 in which it is determined whether the MCG configuration is DL or UL or whether the MCG and SCG configurations both are flexible, e.g. based on the first link radio resource configuration acquired in S603 of FIG. 6 and the multiplexing configuration acquired in S605 of FIG. 6 and, optionally, based on the further acquired second link radio resource configuration.

If "Yes" in S1103, the procedure advances to S1104 in which it is determined that MT is available for the MCG link.

If "No" in S1103, the procedure advances to S1105 in which it is determined that MT is not available.

In case the DU-MT link is the SCG link ("No" in S1102), the procedure advances to S1106 in which it is determined whether the MCG configuration is flexible and the SCG configuration is DL or UL, e.g. based on the first link radio resource configuration acquired in S603 of FIG. 6 and the multiplexing configuration acquired in S605 of FIG. 6 and, optionally, based on the further acquired second link radio resource configuration.

If "Yes" in S1106, the procedure advances to S1107 in which it is determined that MT is available for the SCG link.

If "No" in S1106, the procedure advances to S1108 in which it is determined that MT is not available.

If "Yes" in S1101, the procedure advances to S1109 in which it is determined whether both the MCG configuration and the SCG configuration is UL or DL, e.g. based on the first link radio resource configuration acquired in S603 of FIG. 6 and the multiplexing configuration acquired in S605 of FIG. 6 and, optionally, based on the further acquired second link radio resource configuration.

If "Yes" in S1109, the procedure advances to S1110 in which it is determined that MT is available for the MCG and SCG links.

If "No" in S1109, the procedure advances to S1111 in which it is determined whether a larger MCG utilization is configured, e.g. based on the first link radio resource configuration acquired in S603 of FIG. 6 and the multiplexing configuration acquired in S605 of FIG. 6 and, optionally, based on the further acquired second link radio resource configuration. "Larger MTC utilization configured?" in S1111 refers to a choice between Tables 10B and 10C.

If "Yes" in S1111, Table 10B is used and the procedure advances to S1112 in which it is determined whether the DU-MT link is an MCG link, e.g. based on the multiplexing configuration acquired in S605 of FIG. 6 and/or the acquired priority.

If "Yes" in S1112, the procedure advances to S1113 in which it is determined that MT is available for the MCG link.

If "No" in S1112, the procedure advances to S1114 in which it is determined that MT is not available.

If "No" in S1111, Table 10C is used and the procedure advances to above-described S1102.

According to an aspect, an apparatus is provided, the apparatus comprising means for acquiring a first DU radio resource configuration for a DU of a radio access node configured to operate in a scenario where the DU is one of multiple DUs serving links to a multi-connected entity, means for acquiring a first link radio resource configuration corresponding to a first link of a multi-connectivity link of the multi-connected entity, wherein the first link is served by the DU, means for acquiring a multiplexing configuration of the multi-connectivity link, and means for determining availability of at least one radio resource for the multi-connectivity link based on the first DU radio resource configuration, the first link radio resource configuration, and the multiplexing configuration.

According to an example implementation, the apparatus is part of and/or is used by the DU.

According to an example implementation, the apparatus comprises the control unit 70 of FIG. 7.

According to at least some example embodiments, the apparatus further comprises means for acquiring a priority of the first link, and means for determining the availability of the at least one radio resource for the multi-connectivity link also based on the priority.

According to at least some example embodiments, the apparatus further comprises means for acquiring a second link radio resource configuration corresponding to a second link of the multi-connectivity link, and means for determining the availability of the at least one radio resource for the multi-connectivity link also based on the second link radio resource configuration.

According to at least some example embodiments, the apparatus further comprises means for acquiring a second DU radio resource configuration for another DU serving the second link, and means for determining the availability of the at least one radio resource for the multi-connectivity link also based on the second DU radio resource configuration.

According to at least some example embodiments, the multiplexing configuration between the first link and the second link of the multi-connectivity link corresponds to a time division multiplexing, TDM, scheme or to at least one of a space division multiplexing, SDM, scheme and a frequency division multiplexing, FDM, scheme.

According to at least some example embodiments, at least one of the first link and the second link supports half duplex operation or full duplex operation.

According to at least some example embodiments, the multi-connected entity comprises a child integrated access and backhaul, IAB, node and the first link radio resource configuration is a mobile termination, MT, configuration used for the first link and/or the second link radio resource configuration is an MT configuration used for the second link.

According to at least some example embodiments, the multi-connected entity comprises a user equipment and the first link radio resource configuration is a configuration of the user equipment used for the first link and/or the second link radio resource configuration is a configuration of the user equipment used for the second link.

According to at least some example embodiments, the DU is part of an IAB node which is a parent node for the multi-connected entity.

According to at least some example embodiments, the other DU is part of another IAB node which is another parent node for the multi-connected entity.

According to at least some example embodiments, the apparatus further comprises means for performing scheduling for the first link based on the radio resources determined to be available for the multi-connectivity link based on specific rules utilizing information about the priority and at least one of the first DU radio resource configuration, the second DU radio resource configuration, the first link radio resource configuration and the second link radio resource configuration.

According to at least some example embodiments, the apparatus further comprises means for receiving the first DU radio resource configuration over an F1 connection.

According to at least some example embodiments, the apparatus further comprises means for receiving the second DU radio resource configuration over an F1 connection.

According to at least some example embodiments, the apparatus further comprises means for receiving the first link radio resource configuration over a radio resource control, RRC, connection.

According to at least some example embodiments, the apparatus further comprises means for receiving the second link radio resource configuration over a radio resource control, RRC, connection.

According to at least some example embodiments, the apparatus further comprises means for determining the priority of the first link either explicitly or implicitly.

According to at least some example embodiments, the apparatus further comprises means for determining that the first link has highest priority in case the multiplexing configuration indicates for at least one predefined combination of a first resource corresponding to the first link radio resource configuration and a second resource corresponding to the second link radio resource configuration that the first resource is not available.

According to at least some example embodiments, the apparatus further comprises means for, in case the multiplexing configuration corresponds to at least one of FDM and SDM, and indicates for at least one predefined combination of a first resource corresponding to the first link radio resource configuration and a second resource corresponding to the second link radio resource configuration that the first resource and the second resource are available, determining that the first resource is available.

According to at least some example embodiments, the apparatus further comprises means for receiving an outcome of dynamic resource configuration via the first link.

According to at least some example embodiments, the apparatus further comprises means for acquiring a relayed slot format indication, SFI, configuration related to the second link, wherein the outcome comprises an SFI.

It is to be understood that the above description is illustrative and is not to be construed as limiting. Various modifications and applications may occur to those skilled in the art without departing from the true spirit and scope as defined by the appended claims.

The invention claimed is:

1. A method for use with a distributed unit of a radio access node configured to operate in a scenario where the distributed unit is one of multiple distributed units serving links to a multi-connected entity, the method comprising:
   acquiring a first distributed unit radio resource configuration for the distributed unit;
   receiving a first mobile termination configuration used for a first link corresponding to a first link of a multi-connectivity link of the multi-connected entity, wherein the first link is served with the distributed unit;
   acquiring a multiplexing configuration between the first link and a second link of the multi-connectivity link, said second link being served with another distributed unit;
   receiving a second mobile termination configuration corresponding to the second link of the multi-connectivity link; and
   acquiring a second distributed unit radio resource configuration for the other distributed unit serving the second link;
   determining availability of at least one radio resource for the multi connectivity link based on the first distributed unit radio resource configuration, the first mobile termination configuration, the multiplexing configuration, the second mobile termination configuration, and the second distributed unit radio resource configuration;
   receiving the first mobile termination configuration over a radio resource control connection;
   receiving the second mobile termination configuration over a radio resource control connection;
   making a first determination that the multiplexing configuration indicates that the first resource is not available for at least one predefined combination of a first resource corresponding to the first mobile termination configuration and a second resource corresponding to the second mobile termination configuration;
   based on the first determination, determining that the first link has highest priority; and
   based on the first link having the highest priority:
      making a second determination that the multiplexing configuration corresponds to frequency division multiplexing and space division multiplexing, and indicates for at least one predefined combination of the first resource corresponding to the first mobile termination configuration and a second resource corresponding to the second mobile termination configuration that the first resource and the second resource are available; and
      based on the second determination, determining that the first resource is available.

2. The method of claim 1, further comprising: receiving the first distributed unit radio resource configuration over an F1 connection, or receiving the second distributed unit radio resource configuration over an F1 connection.

3. The method of claim 1, further comprising: receiving the first distributed unit radio resource configuration over an F1 connection.

4. The method of claim 1, further comprising: receiving the first distributed unit radio resource configuration over an F1 connection, and receiving the second distributed unit radio resource configuration over an F1 connection.

5. The method of claim 4, further comprising: receiving the first mobile termination configuration over a radio resource control connection, and receiving the second mobile termination configuration over a radio resource control connection.

6. The method of claim 5, comprising: receiving an outcome of dynamic resource configuration via the first link.

7. The method of claim 6, comprising: acquiring a relayed slot format indication configuration related to the second link, wherein the outcome comprises a slot format indication.

8. A system for use with a distributed unit of a radio access node configured to operate in a scenario where the distributed unit is one of multiple distributed units serving links to a multi-connected entity, the system comprising:
   an apparatus;
   a processor; and
   a non-transitory computer-readable media comprising computer-executable instructions that, when executed by the processor, cause the processor to perform the following operations:
      acquiring a first distributed unit radio resource configuration for the distributed unit;
      receiving a first mobile termination configuration used for a first link corresponding to a first link of a multi-connectivity link of the multi-connected entity, wherein the first link is served with the distributed unit;
      acquiring a multiplexing configuration between the first link and a second link of the multi-connectivity link, said second link being served with another distributed unit;
      receiving a second mobile termination configuration corresponding to the second link of the multi-connectivity link; and
      acquiring a second distributed unit radio resource configuration for the other distributed unit serving the second link;
      determining availability of at least one radio resource for the multi connectivity link based on the first distributed unit radio resource configuration, the first mobile termination configuration, the multiplexing configuration, the second mobile termination configuration, and the second distributed unit radio resource configuration;
      receiving the first mobile termination configuration over a radio resource control connection;
      receiving the second mobile termination configuration over a radio resource control connection;
      making a first determination that the multiplexing configuration indicates that the first resource is not available for at least one predefined combination of a first resource corresponding to the first mobile termination configuration and a second resource corresponding to the second mobile termination configuration;
      based on the first determination, determining that the first link has highest priority; and
      based on the first link having the highest priority:
         making a second determination that the multiplexing configuration corresponds to frequency division multiplexing and space division multiplexing, and indicates for at least one predefined combination of a first resource corresponding to the first mobile termination configuration and a second resource corresponding to the second mobile termination configuration that the first resource and the second resource are available; and
         based on the second determination, determining that the first resource is available.

9. The system of claim 8, wherein the computer-executable instructions further cause the processor to receive the first distributed unit radio resource configuration over an F1 connection, or receive the second distributed unit radio resource configuration over an F1 connection.

10. The system of claim 8, wherein the computer-executable instructions further cause the processor to receive the first distributed unit radio resource configuration over an F1 connection.

11. The system of claim 8, wherein the computer-executable instructions further cause the processor to receive the first distributed unit radio resource configuration over an F1 connection, and receive the second distributed unit radio resource configuration over an F1 connection.

12. The system of claim 8, wherein the computer-executable instructions further cause the processor to receive the first mobile termination configuration over a radio resource control connection, and receive the second mobile termination configuration over a radio resource control connection.

13. The system of claim 8, wherein the computer-executable instructions further cause the processor to receive an outcome of dynamic resource configuration via the first link.

14. The system of claim 8, wherein the computer-executable instructions further cause the processor to acquire a relayed slot format indication configuration related to the second link, wherein the outcome comprises a slot format indication.

15. An apparatus for use with a distributed unit of a radio access node configured to operate in a scenario where the distributed unit is one of multiple distributed units serving links to a multi-connected entity, the apparatus comprising:
   a processor; and
   a non-transitory computer-readable media comprising computer-executable instructions that, when executed by the processor, cause the processor to perform the following operations:
      acquiring a first distributed unit radio resource configuration for the distributed unit;
      receiving a first mobile termination configuration used for a first link corresponding to a first link of a multi-connectivity link of the multi-connected entity, wherein the first link is served with the distributed unit;
      acquiring a multiplexing configuration between the first link and a second link of the multi-connectivity link, said second link being served with another distributed unit;
      receiving a second mobile termination configuration corresponding to the second link of the multi-connectivity link; and
      acquiring a second distributed unit radio resource configuration for the other distributed unit serving the second link;
      determining availability of at least one radio resource for the multi connectivity link based on the first distributed unit radio resource configuration, the first mobile termination configuration, the multiplexing configuration, the second mobile termination configuration, and the second distributed unit radio resource configuration;
      receiving the first mobile termination configuration over a radio resource control connection;
      receiving the second mobile termination configuration over a radio resource control connection;
      making a first determination that the multiplexing configuration indicates that the first resource is not available for at least one predefined combination of a first resource corresponding to the first mobile termination configuration and a second resource corresponding to the second mobile termination configuration;
      based on the first determination, determining that the first link has highest priority; and
      based on the first link having the highest priority:
         making a second determination that the multiplexing configuration corresponds to frequency division multiplexing and space division multiplexing, and indicates for at least one predefined combination of a first resource corresponding to the first mobile termination configuration and a second resource corresponding to the second mobile termination configuration that the first resource and the second resource are available; and
         based on the second determination, determining that the first resource is available.

16. The apparatus of claim 15, wherein the computer-executable instructions further cause the processor to:
   receive the first distributed unit radio resource configuration over an F1 connection, or receive the second distributed unit radio resource configuration over an F1 connection; and
   receive the first mobile termination configuration over a radio resource control connection, or receive the second mobile termination configuration over a radio resource control connection.

17. The apparatus of claim 15, wherein the computer-executable instructions further cause the processor to receive the first distributed unit radio resource configuration over an F1 connection, and receive the second distributed unit radio resource configuration over an F1 connection.

18. The apparatus of claim 15, wherein the computer-executable instructions further cause the processor to receive the first mobile termination configuration over a radio resource control connection, and receive the second mobile termination configuration over a radio resource control connection.

19. The apparatus of claim 8, wherein the computer-executable instructions further cause the processor to:
   receive the first distributed unit radio resource configuration over an F1 connection, and receive the second distributed unit radio resource configuration over an F1 connection; and
   receive the first mobile termination configuration over a radio resource control connection, and receive the second mobile termination configuration over a radio resource control connection.

20. The apparatus of claim 8, wherein the computer-executable instructions further cause the processor to:
   receive an outcome of dynamic resource configuration via the first link; and
   acquire a relayed slot format indication configuration related to the second link, wherein the outcome comprises a slot format indication.

* * * * *